United States Patent [19]

Trumbetas et al.

[11] Patent Number: 5,631,034
[45] Date of Patent: May 20, 1997

[54] PREPARATION OF AN AQUEOUS SUGAR FROSTING MIX

[75] Inventors: Jerome F. Trumbetas, Tarrytown; Joaquin C. Lugay, Mahopac; Jimbay P. Loh, Peekskill; Keisuke Morimoto, Congers, all of N.Y.

[73] Assignee: Kraft Foods, Inc., Northfield, Ill.

[21] Appl. No.: 221,156

[22] Filed: Mar. 31, 1994

[51] Int. Cl.⁶ ............................................. A23G 3/00
[52] U.S. Cl. .................. 426/302; 426/321; 426/659
[58] Field of Search ........................ 426/103, 96, 302, 426/321, 522, 659, 32

[56] References Cited

U.S. PATENT DOCUMENTS

| | | | |
|---|---|---|---|
| 2,914,410 | 11/1959 | Butler | 426/659 |
| 2,928,747 | 3/1960 | Nowlin | 426/659 |
| 3,649,302 | 3/1972 | Daggy et al. | 426/659 |
| 3,874,924 | 4/1975 | Sands et al. | 426/659 |
| 3,955,008 | 5/1976 | Hanamoto | 426/659 |
| 4,037,000 | 7/1977 | Burge et al. | 426/659 |
| 4,135,005 | 1/1979 | Cheng | 426/659 |
| 4,338,339 | 7/1982 | Edwards | 426/659 |
| 5,230,918 | 7/1993 | Anderson et al. | 426/659 |

*Primary Examiner*—Anthony J. Weier
*Attorney, Agent, or Firm*—Thomas A. Marcoux; Linn I. Grim; Thomas R. Savoie

[57] ABSTRACT

A method for preparing an aqueous sugar frosting mix by grinding an aqueous sugar saturated solution containing dispersed crystalline sugar in said saturated solution to produce a smooth, opaque, viscous syrup suitable for use as a frosting mix on cereals, pastries, cakes and the like.

21 Claims, No Drawings

PREPARATION OF AN AQUEOUS SUGAR FROSTING MIX

BACKGROUND OF THE INVENTION

The present invention relates to the preparation of an aqueous sugar solution containing dispersed excess sugar crystals suitable for use as a frosting mix. More specifically, this invention relates to the preparation of a frosting mix by grinding an aqueous saturated sugar solution containing dispersed excess crystalline sugar to form a viscous syrup having sugar crystals in the size range from about 0.1 to about 50 microns.

In the cereal and bakery business, it is highly desirable to frost or ice products with sugar ingredients to improve or increase the sweetness and physical appearance of the finished product. Frosting or icing mixes can be any color depending on its ingredients. A snow-white appearance is sought after for frostings especially for cereals.

Many processes are known to produce frosting mixes and these processes tend to be complicated and difficult to control in producing an ideal frosting product. The addition of sugar to a heated aqueous solution, i.e., without sugar crystals, to produce a saturated aqueous sugar solution can provide a frosting mix which, when coating a cereal will increase the sweetness level but the resulting dried product will be glossy, transparent and not have a snow-white or distinguished color effect. If a super-saturated aqueous sugar solution is prepared, exceptionally high temperatures, well above the boiling point of water, are required to put excess sugar into solution and on cooling, the excess sugar crystals will precipitate from the solution. As the super-saturated sugar solution is further cooled, large crystals will form. If this product is used as a frosting mix, the non-uniform sugar crystals on drying, will provide an uneven, undesirable frosting which does not have an appearance of a distinguished snow-white or colored effect. By the present invention, a process is provided, in a simple manner, that prepares an aqueous sugar frosting mix at low temperatures, i.e., below water boiling temperatures, that when sprayed onto cereals or other products produces sugar crystals of small sizes encapsulated in a clear amphorous film having exceptionally highly desirable snow-white appearance on drying. If colored frostings are desired, added color ingredients will provide distinctive color effects when light hits the small sized sugar crystals encapsulated in an amphorous film.

SUMMARY OF THE INVENTION

By means of this invention a highly desirable aqueous sugar frosting mix is prepared by initially forming an aqueous solution at temperatures in the range from room temperature to about 180° F., by adding to the aqueous liquid a crystal growth inhibitor which can include hydrated proteins, hydrocolloids, sugar and mixtures thereof. Although not essential for baked goods, these crystal growth inhibitors should also have binding properties so that when the frosting mix is dried on a product such as cereal or other materials, the dried frosting mix will permanently remain on the product. To the aqueous solution, sufficient sugar is added to produce an aqueous sugar saturated solution comprising excess crystalline sugar dispersed in said sugar-saturated solution. The crystal growth inhibitor sugar must be different from the sugar in the saturated solution. This sugar-saturated solution containing sugar crystals is then ground to reduce the size of the crystalline sugar to small sizes from about 0.1 to about 50 microns.

DETAILED DESCRIPTION OF THE INVENTION

A product of this invention is a viscous mixture having sugar crystals in the size range from about 0.1 to about 50 microns dispersed in the syrup. This product can be sprayed onto cereals, baked goods, fried baked goods and the like to provide a dry snow-white frosting.

The initial step in this invention is to form an aqueous solution, at temperatures in the range from room temperature to about 180° F., preferably in the range from about 135° F. to about 145° F., by adding to the aqueous liquid a crystal growth inhibitor. The aqueous liquid may simply be water or it can be fruit juices, milk including regular milk, skim milk, low fat milk condensed milk or the like. The crystal growth inhibitors placed in the water solution must have the properties of avoiding crystal growth of the sugar and also it is preferred that the crystal growth inhibitor possess binding properties so that as the frosting mix is placed or sprayed on the product, the frosting adheres. Typical of the crystal growth inhibitors include edible hydrated proteins such as gelatin, egg white, milk protein, soy protein, and the like. Also satisfactory crystal growth inhibitors include edible hydrocolloids such as gum Arabic, gum Ghatti, gum karaya, gum tragacanth, locust bean gum, pectins especially low methoxy pectin, gellan, agar, carrageenan, alginates, xanthan gum, sodium carboxymethyl cellulose, methyl cellulose, hydroxy propylcellulose and the like and mixtures thereof. The type of sugar used as a crystal growth inhibitor must be different from the sugar used to form the aqueous saturated solution containing excess crystalline sugar. These sugars can include monosaccharides and disaccharides which can include glucose, fructose, sucrose, maltose, lactose. Also included are sugar alcohols such as maltitol, lactitol, xylitol, sorbitol, glycerol and mixtures thereof. The preferred hydrated protein is gelatin. The amounts of crystal growth inhibitors used can range from about 0.05 to about 1.5 weight percent, preferably 0.20 to about 0.7 weight percent based on the total composition of the finished product.

After the aqueous liquid containing the crystal inhibitor has been heated to the desired temperature, sufficient sugar is added to the aqueous liquid to provide an aqueous sugar-saturated solution comprising crystalline sugar dispersed in said aqueous sugar-saturated solution. This means that excess sugar is added to the solution so that the saturated sugar solution contains crystalline sugar dispersed in the aqueous saturated sugar solution. The amounts of sugar added to the aqueous liquid will depend on the temperature of the aqueous liquid since a saturated sugar solution which must be achieved, is dependent on the temperature. Once the sugar saturated solution is achieved, excess sugar is added to obtain a dispersion of crystalline sugar in the saturated sugar solution. The amount of sugar in this composition can range from about 70 to about 90 weight percent, preferably in amounts ranging from about 80 to about 87 weight percent based on the total composition. The amount of aqueous liquid in this composition can range from about 9 to about 29 weight percent, preferably from about 12.5 to about 19.5 weight percent based on the total composition.

The next step is the unusual feature of this invention. The saturated sugar solution containing the dispersed crystalline sugar is then passed through a grinder to reduce the size of the crystalline sugar in the saturated sugar solution to about 0.1 to about 50 microns, preferably about 0.5 to about 30 microns. After the wet grinding, a smooth, opaque, viscous sugar dispersion is produced which can be used as a frosting mix including spraying and drying the product onto cereal, cakes, donuts and the like achieving a snow-white frosting effect. As has been described, on drying the small sugar crystalline particles are encapsulated in a clear amphorous film on the product to be frosted. The edible crystal growth inhibitor present in the solution prevents the formation of the sugar crystals to larger crystals and the smaller sugar crystals provide a much whiter frosting than the larger sugar crystals. The frosting mix of this invention also can contain color ingredients which provide unusual color frostings when light strikes the sugar crystals which are encapsulated in the amphorous film.

The sugars which can be used in the process of this invention are the crystalline sugars. These include monosaccharides and disaccharides including glucose, fructose, sucrose, maltose, lactose and the like, and sugar alcohol such as maltitol, lactitol, xylitol, sorbitol, glycerol, fructose or mixtures thereof and the like.

A flavored sugar product may be prepared by incorporating a flavorant into the sugar matrix. These flavorants can include natural flavor extracts, essential oils such as lemon oil or peppermint oil and the like or artificial flavorings.

The grinder which can be used to wet grind the sugar crystals in the sugar saturated aqueous solution, can be any grinder capable of reducing the sugar crystals to size below 50 microns and sizes to as low of 0.1 microns. An efficient grinder for this purpose is a "Dyno-Mill" manufactured by Willy A. Bachofen AG and can be obtained in the U.S. through Glen Mills Inc., Maywood, N.J. The Dyno-Mill grinds the crystalline-sugar containing saturated solution to an extremely fine particle size and disperses the finely ground sugar crystals within the liquid medium into a smooth, opaque, viscous syrup. The sugar saturated solution containing sugar crystals is pumped through a horizontal chamber containing beads having diameters from about 1.0 to about 6.0 mm. The type of beads that can be used include, among others, glass, stainless steel, zirconium oxide and other ceramic beads. An agitation shaft with rotor discs moves the beads at great speed impacting them millions of time against the sugar crystals. The impact generated by this action reduce the sugar crystals to about 0.1 to about 50 microns with the majority of particles being in the sizes of about 0.5 to about 30 microns. This creates a uniform dispersion of the small crystalline sugar particles in the sugar-water viscous syrup. This viscous syrup is discharged continuously while the beads are retained in the Dyno-Mill by a "dynamic separator" which forms an adjustable gap that holds the beads in the machine while allowing the crystalline sugar-containing viscous syrup to exit.

The viscous syrups of this invention can be sprayed onto cereals such as bite size flakes, etc., and also sprayed on baked goods such as donuts, cakes, pastries and the like. These products contained on a passing belt can be sprayed with the crystalline sugar viscous syrup (at temperatures of 140° F.) and are immediately dried. The excess product sprayed on the belt can be recovered by redissolving in water and recycled since the temperatures throughout the process are below the boiling point of water. Certain heat sensitive crystal growth inhibitors are not destroyed and are reusable. Other efficiencies are observed in the use of standard nozzles for spraying since the size of the sugar crystals in the viscous syrup are small, i.e., below 50 microns, the spray nozzles are free of plugging which is a common difficulty when solids are spray dried.

The following examples illustrate this invention.

EXAMPLE 1

In a kettle equipped with mixers, 14.5 pounds of water and 0.5 pound of gelatin are heated to 140° F. To this mixture is added 85 pounds of granulated sugar with stirring. The slurry which is formed is passed to a "Dyno-Mill" and pumped through a horizontal grinding chamber filled to 85% capacity with glass beads having diameters 1.0 to 6.0 mm. Inside the grinding chamber, a rapid rotating shaft (1500 rpm) fitted with specially designed discs drive the beads to rotate at an even more rapid rate. The impact force of millions of beads pulverized the sugar crystals in the aqueous sugar saturated solution which were subsequently discharged through a gap or opening in a separator for the beads. The grinding was done at one atmosphere of pressure and a temperature between 135° to 145° F. A smooth, opaque, viscous syrup having sugar crystals in the range from about 0.5 to 30 microns was obtained.

EXAMPLE 2

A portion of the aqueous viscous syrup at temperatures of 140° F. of Example 1 was sprayed on a bite sized cereal and on immediate drying formed a frosting having individual units of a clear amorphous film containing small crystals. The frosting provides a highly desirable snow-white effect. To achieve a softer frosting, a small amount of glycerin can be added to ingredients which provide a softer clear amphorous film containing sugar crystals. If a saturated aqueous sugar solution, i.e., without the presence of sugar crystals, at 140° F. were sprayed on a bite size cereal, individual units of a clear amphorous film without sugar crystals would result and a desirable white frosting would not be achieved.

What is claimed is:

1. A method for preparing an aqueous sugar frosting mix comprising the following steps:
   (1) forming an aqueous solution at temperatures ranging from room temperature to about 180° F. by adding an edible, water soluble crystal growth inhibitor selected from the group consisting of a hydrated protein, hydrocolloids, a first sugar and mixtures thereof to an aqueous liquid;
   (2) adding a sufficient amount of a second sugar to said aqueous solution of step (1) to provide an aqueous sugar saturated solution comprising a crystalline sugar, wherein said second sugar is different from said first sugar dispersed in said aqueous sugar saturated solution; and
   (3) grinding said crystalline containing saturated solution of step (2) to provide a viscous syrup having sugar crystals ranging in size from about 0.1 to about 50 microns.

2. The method of claim 1 wherein the viscous syrup has sugar crystals ranging in size from about 0.5 to about 30 microns.

3. The method of claim 1 wherein the viscous syrup comprises from about 70 to about 90 percent by weight of said second sugar, from about 9 to about 29 percent by weight of said aqueous liquid and from about 0.05 to about 1.0 percent by weight of said crystal growth inhibitor, said percentages based on the total weight of the viscous syrup.

4. The method of claim 3 wherein the viscous syrup comprises from about 80 to about 87 percent by weight of said second sugar, from about 12.5 to about 19.5 percent by weight of said aqueous liquid and from about 0.20 to about 0.7 percent by weight of said crystal growth inhibitor, said percentages based on the total weight of the viscous syrup.

5. The method of claim 1 wherein the hydrated protein is selected from the group consisting of gelatin, egg white, milk proteins, soy protein and the like.

6. The method of claim 4 wherein the hydrated protein is selected from the group consisting of gelatin, egg white, milk proteins, soy protein and the like.

7. The method of claim 1 wherein the crystal growth inhibitor is a hydrated protein wherein said hydrated protein is gelatin.

8. The method of claim 4 wherein the crystal growth inhibitor is a hydrated protein wherein said hydrated protein is gelatin.

9. The method of claim 1 wherein said hydrocolloids are selected from the group consisting of gum Arabic, gum Ghatti, gum karaya, gum tragacanth, gellan, locust bean gum, pectins, agar, carrageenan, alginates, xanthan gum, sodium carboxymethyl cellulose, methyl cellulose, hydroxypropylcellulose and the like and mixtures thereof.

10. The method of claim 4 wherein said hydrocolloids are selected from the group consisting of gum Arabic, gum Ghatti, gum karaya, gum tragacanth, gellan, locust bean gum, pectins, agar, carrageenan, alginates, xanthan gum, sodium carboxymethyl cellulose, methyl cellulose, hydroxypropylcellulose and the like and mixtures thereof.

11. The method of claim 9 wherein said pectins are low methoxy pectins.

12. The method of claim 10 wherein said pectins are low methoxy pectins.

13. The method of claim 1 wherein said aqueous liquid is selected from the group consisting of water, fruit juices, milk and the like.

14. The method of claim 4 wherein said aqueous liquid is selected from the group consisting of water, fruit juices, milk and the like.

15. The method of claim 13 wherein said aqueous liquid is water.

16. The method of claim 14 wherein said aqueous liquid is water.

17. The method of claim 1 wherein said first and second sugars are selected from the group consisting of glucose, fructose, sucrose, maltose, lactose, maltitol, lactitol, xylitol, sorbitol, glycerol and the like and mixtures thereof.

18. The method of claim 4 wherein said first and second sugars are selected from the group consisting of glucose, fructose, sucrose, maltose, lactose, maltitol, lactitol, xylitol, sorbitol, glycerol and the like and mixtures thereof.

19. The method of claim 1 wherein said temperature at which said aqueous solution of step (1) is formed ranges from about 135° F. to about 145° F.

20. A method of using an aqueous sugar frosting mix of claim 1 wherein said aqueous sugar frosting mix is sprayed onto a cereal product.

21. A method of using an aqueous sugar frosting mix of claim 1 wherein said aqueous sugar frosting mix is sprayed onto a baked good product.

* * * * *